United States Patent
Son et al.

[11] Patent Number: 5,424,848
[45] Date of Patent: Jun. 13, 1995

[54] OPERATIONAL CONTROL APPARATUS AND METHOD FOR A VIEDO CASSETTE RECORDER UTILIZING A SHUTTLE RING

[75] Inventors: Dae I. Son; Young T. Jung; Se I. Cha, all of Kyunggi, Rep. of Korea

[73] Assignee: Goldstar Co., Ltd., Seoul, Rep. of Korea

[21] Appl. No.: 91,390

[22] Filed: Jul. 15, 1993

[30] Foreign Application Priority Data

Jul. 16, 1992 [KR] Rep. of Korea .................. 92-12664
Dec. 30, 1992 [KR] Rep. of Korea .................. 92-26388

[51] Int. Cl.⁶ .............................................. H04N 5/76
[52] U.S. Cl. ...................................... 358/335; 360/69
[58] Field of Search .............................. 358/335, 310; 455/179.1, 185.1, 186.1; 348/731, 732, 733, 734; 360/33.1, 10.3, 69; H04N 5/76, 5/78, 5/781, 5/782, 5/783, 9/79, 5/92, 5/44, 5/50

[56] References Cited

U.S. PATENT DOCUMENTS

| | | | |
|---|---|---|---|
| 4,139,872 | 2/1979 | Tachi | 360/10.3 |
| 4,161,001 | 7/1979 | Sakamoto | 360/10.3 |
| 4,428,005 | 1/1984 | Kubo | 360/10.3 |
| 4,786,982 | 11/1988 | Wakahara et al. | 358/335 |
| 4,866,542 | 9/1989 | Shimada et al. | 358/335 |
| 5,237,211 | 8/1993 | Tanaka et al. | 307/249 |

*Primary Examiner*—Tommy P. Chin
*Assistant Examiner*—Thai Tran
*Attorney, Agent, or Firm*—Keck, Mahin & Cate

[57] ABSTRACT

An operational mode control apparatus and method for a VCR utilizing a shuttle ring comprises a shuttle section having a shuttle ring and providing a digital signal corresponding to a rotational angle of the shuttle ring, and a microcomputer for determining a divided region of the rotational angle of the shuttle ring according to the digital signal provided from the shuttle section and performing an operational mode corresponding to the determined region of the rotational angle. The structure of the shuttle ring can be improved and the rotational angle of the shuttle ring is subdivided into regions in order to control all operational modes, including reproduction-related modes, a tuning mode and an OSD mode of a VCR. Therefore, a separate key matrix for mode selection is not required and the manufacturing cost can be reduced.

5 Claims, 5 Drawing Sheets

FIG. 7A

| TERMINAL \ ANGLE | -60 | -50 | -40 | -30 | -20 | -10 | 0 | 10 | 20 | 30 | 40 | 50 | 60 |
|---|---|---|---|---|---|---|---|---|---|---|---|---|---|
| 1 | ▨ | ▨ | ▨ | ▨ | ▨ | ▨ | □ | | | | | | |
| 2 | | ▨ | ▨ | ▨ | ▨ | | | | | ▨ | ▨ | ▨ | |
| 3 | ▨ | | | ▨ | ▨ | | | ▨ | ▨ | | | ▨ | ▨ |
| 4 | ▨ | ▨ | | | | | | | | | ▨ | ▨ | ▨ |
| B⁺ | ▨ | ▨ | ▨ | ▨ | ▨ | ▨ | ▨ | ▨ | ▨ | ▨ | ▨ | ▨ | ▨ |

FIG. 7B

| TERMINAL \ MODE | A | B | C | D | E | F | G | H | I | J | K | L | M | N |
|---|---|---|---|---|---|---|---|---|---|---|---|---|---|---|
| 1 | 1 | 1 | 1 | 1 | 1 | 1 | 1 | 0 | 0 | 0 | 0 | 0 | 0 | 0 |
| 2 | 0 | 1 | 1 | 1 | 1 | 0 | 0 | 0 | 0 | 1 | 1 | 1 | 1 | 0 |
| 3 | 1 | 1 | 0 | 0 | 1 | 1 | 0 | 0 | 1 | 1 | 0 | 0 | 1 | 1 |
| 4 | 1 | 1 | 1 | 0 | 0 | 0 | 0 | 0 | 0 | 0 | 0 | 1 | 1 | 1 |

FIG. 8

| FIXED CONTACT | ROTATIONAL ANGLE | A/D CONVERTED OUTPUT | OPERATION MODE |
|---|---|---|---|
| ⋮ | ⋮ | ⋮ | ⋮ |
| a1 | 40 | 1100 | REVERSE HIGH SPEED SEARCH (D) |
| a2 | 30 | 1110 | REVERSE SEARCH (E) |
| a3 | 20 | 1010 | REVERSE NORMAL SPEED REPRODUCTION (F) |
| a4 | 10 | 1000 | REVERSE LOW SPEED REPRODUCTION (G) |
| a5 | 0 | 0000 | STILL (H) |
| a6 | 10 | 0010 | LOW SPEED REPRODUCTION (I) |
| a7 | 20 | 0110 | NORMAL SPEED REPRODUCTION (J) |
| a8 | 30 | 0100 | SEARCH (K) |
| a9 | 40 | 0101 | HIGH SPEED (L) |
| ⋮ | ⋮ | ⋮ | |

OPERATIONAL CONTROL APPARATUS AND METHOD FOR A VIEDO CASSETTE RECORDER UTILIZING A SHUTTLE RING

BACKGROUND OF THE INVENTION

1. Field of the Invention

The present invention relates to an operational control apparatus and method for a video cassette recorder (hereinafter referred to as "VCR") utilizing a shuttle ring, and more particularly to an operational mode control apparatus and method for a VCR which can control all operations of the VCR by utilizing a shuttle ring as well as improve the structure of the shuttle ring

2. Description of the Prior Art

In a conventional VCR with a shuttle ring, all operation modes related to reproduction, such as high speed search mode, normal speed reproduction mode, low speed reproduction mode, still mode, etc., can be controlled by operating the shuttle ring.

As shown in FIG. 1, a conventional operational control apparatus for a VCR with a shuttle ring comprises a shuttle section 1 including a shuttle ring and generating a digital signal for mode control in accordance with a rotational angle of the shuttle ring, a syscon microcomputer 5 for determining operational mode by the digital signal outputted from shuttle section 1 and providing a mode control signal to perform the determined operational mode, a key matrix 2 composed of a plurality of keys for selecting operational modes of a VCR, a timer microcomputer 3, and a display section 4 for displaying the selected mode.

In the conventional apparatus constructed as above, a code signal in accordance with a rotational angle of the shuttle ring is generated from shuttle section 1 and is supplied to syscon microcomputer 5. Also, a key signal for selecting the operational mode of a VCR is generated from key matrix 2 and is also supplied to syscon microcomputer 5 through timer microcomputer 3. Display section 4 is connected to timer microcomputer 3 in order to visually display the present mode selected by key matrix 2 or shuttle section 1.

However, in such a conventional apparatus, shuttle section 1 can control only modes related to reproduction, so that key matrix 2 should be provided together with shuttle section 1 in order to control all operational modes of a VCR.

FIG.2 shows the structure of shuttle section 1 in the conventional apparatus of FIG. 1. Referring to FIG. 2, the shuttle section includes a shuttle ring 1a, being rotated by a user, to provide digital signals DS1 to DS4 in accordance with its rotational angle. Shuttle ring 1a has a substrate 1b having contact patterns formed thereon and generates digital signals DS1 to DS4 by selectively supplying B+ supply voltage through a resistor R to the contacts, respectively in accordance with the rotational angle thereof. That is, if the rotational angle $\theta$ of shuttle ring 1a is in a region between 0° and 20° shuttle ring 1a provides digital signals of "1000" (where, 1 is "high" level and 0 is "low" level), and if $20° \leq \theta < 40°$, "1010" is outputted.

The operational of the conventional control apparatus constructed as above will be explained with reference to FIG. 1 to FIG.4.

When the B+ supply voltage is applied, shuttle ring 1a provides to syscon microcomputer 5 digital signal DS1 to DS4, which varies as the user rotates shuttle ring 1a. Referring to FIG. 3, if a video tape is safely placed in a deck and mode selection can be performed by shuttle ring 1a, syscon microcomputer 5 determines the rotational angle of shuttle ring 1a according to the signal DS1 to DS4 received from shuttle section 1 as shuttle ring 1a rotates and provides a mode control signal for performing an operational mode corresponding to the determined rotational angle.

For example, assume that shuttle ring 1a rotates clockwise, if $0° \leq \theta < 20°$, then still mode is performed, and if $20° \leq \theta < 40°$, then low speed reproduction is performed. After that, as shuttle ring 1 rotates clockwise further, forward reproduction is performed at a higher speed.

Meanwhile, assume that shuttle ring 1a rotates counterclockwise, if $-20° \leq \theta < 0°$, then reverse low speed reproduction mode is performed, and if $-40° \leq \theta < -20°$, then reverse normal speed reproduction mode is performed. After that, as shuttle ring 1 rotates counterclockwise further, reverse reproduction is performed at a higher speed.

In this state, if a user takes his hand off shuttle ring 1a, shuttle ring 1a is restored to its original position of 0° and still mode is performed. Stop mode can be performed only when a stop key is entered through key matrix 2.

However, since the shuttle ring in the conventional apparatus should employ a substrate patterned by specific contacts with four or more lines, the structure thereof becomes complex and the manufacturing cost increases.

SUMMARY OF THE INVENTION

It is an object of the present invention to provide an operational mode control apparatus and method for a VCR which can perform all operational modes of a VCR by means of a shuttle ring without using a key matrix.

It is another object of the present invention to provide an operational mode control apparatus and method for a VCR which can improve the structure of a shuttle ring and thus reduce the manufacturing cost and increase the endurance thereof.

In order to achieve the above objects, there is provided an operational control apparatus for a VCR utilizing a shuttle ring comprising:

a shuttle section having the shuttle ring, the shuttle section providing a digital signal corresponding to a subdivided region of the whole rotational angle of the shuttle ring; and a microcomputer for determining the region of the rotational angle of the shuttle ring according to the digital signal provided from the shuttle section and providing an operational mode control signal corresponding to the determined region of the rotational angle;

wherein the number of the subdivided regions is determined corresponding to that of all operational modes including reproduction-related modes, a tuning mode, and an on-screen display (OSD) mode of the VCR.

Moreover, in order to achieve the above objects, there is provided an operational mode control method for a VCR utilizing a shuttle ring, comprising the steps of:

determining in which region the present rotational angle of the shuttle ring is among predetermined regions of reproduction-related modes, a tuning mode, and an on-screen display mode after a video cassette tape is safely placed;

performing one of the reproduction-related modes corresponding to a subdivided region in the region of the reproduction-related modes if it is determined that the present rotational angle is in the region of the reproduction-related modes;

tuning a channel by increasing or decreasing a tuning channel frequency in accordance with the rotational direction of the shuttle ring within the region of the tuning mode if it is determined that the present rotational angle is in the region of the tuning mode; and making a cursor on a display screen move in the positive or negative direction in accordance with the rotational direction of the shuttle ring within the region of the on-screen display mode if it is determined that the present rotational angle is in the region of the on-screen display mode.

BRIEF DESCRIPTION OF THE DRAWINGS

The above objects and other advantages of the present invention will become more apparent by describing the preferred embodiments thereof with reference to the accompanying drawings, in which:

FIGS. 7A and 7B show tables illustrating the patterned contacts of the shuttle ring and digital signals for each mode selected by the shuttle section according to the present invention.

FIG. 8 shows a signal state for each mode selected by the shuttle section according to the embodiment of FIG. 6.

DETAILED DESCRIPTION OF THE PREFERRED EMBODIMENTS

Figure 1:
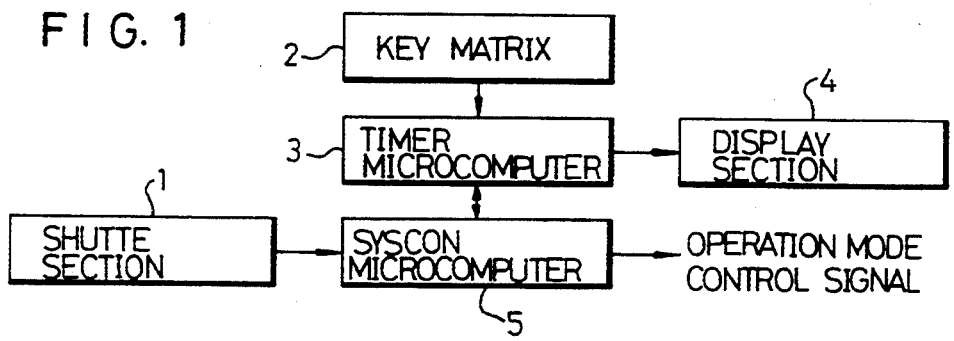
FIG. 1 is a block diagram of the conventional operational control apparatus for a VCR utilizing a shuttle ring.
Figure 2:
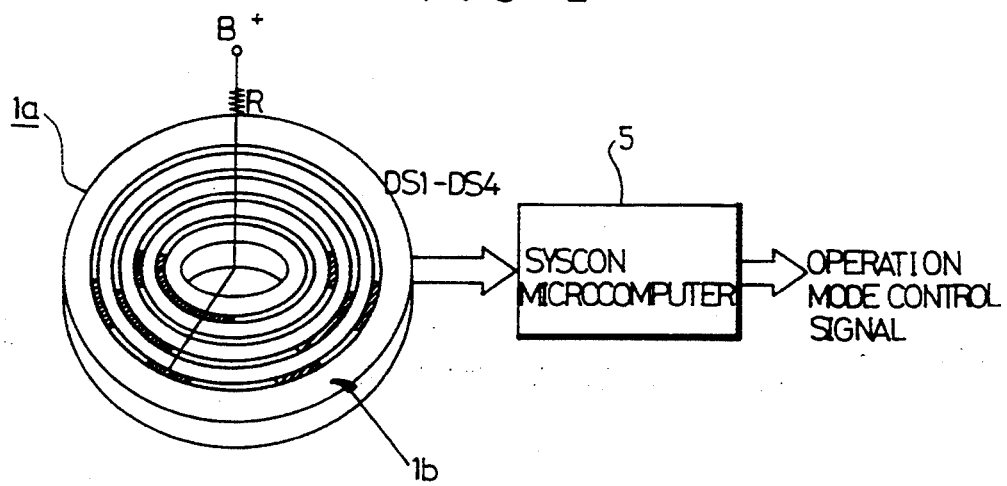
FIG. 2 is a block diagram showing the construction of the shuttle section in FIG. 1.
Figure 3:
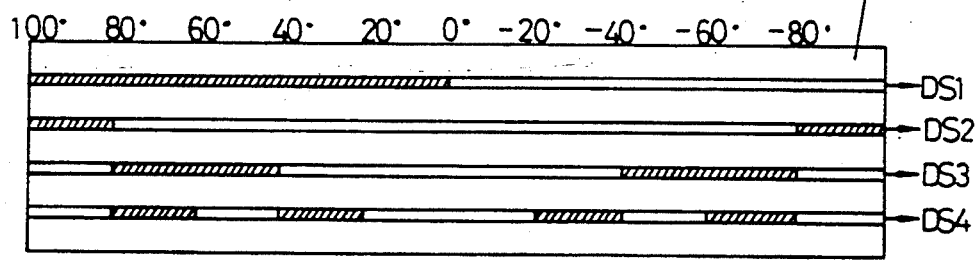
FIG. 3 is a development view of the substrate of shuttle ring in FIG. 2.
Figure 4:
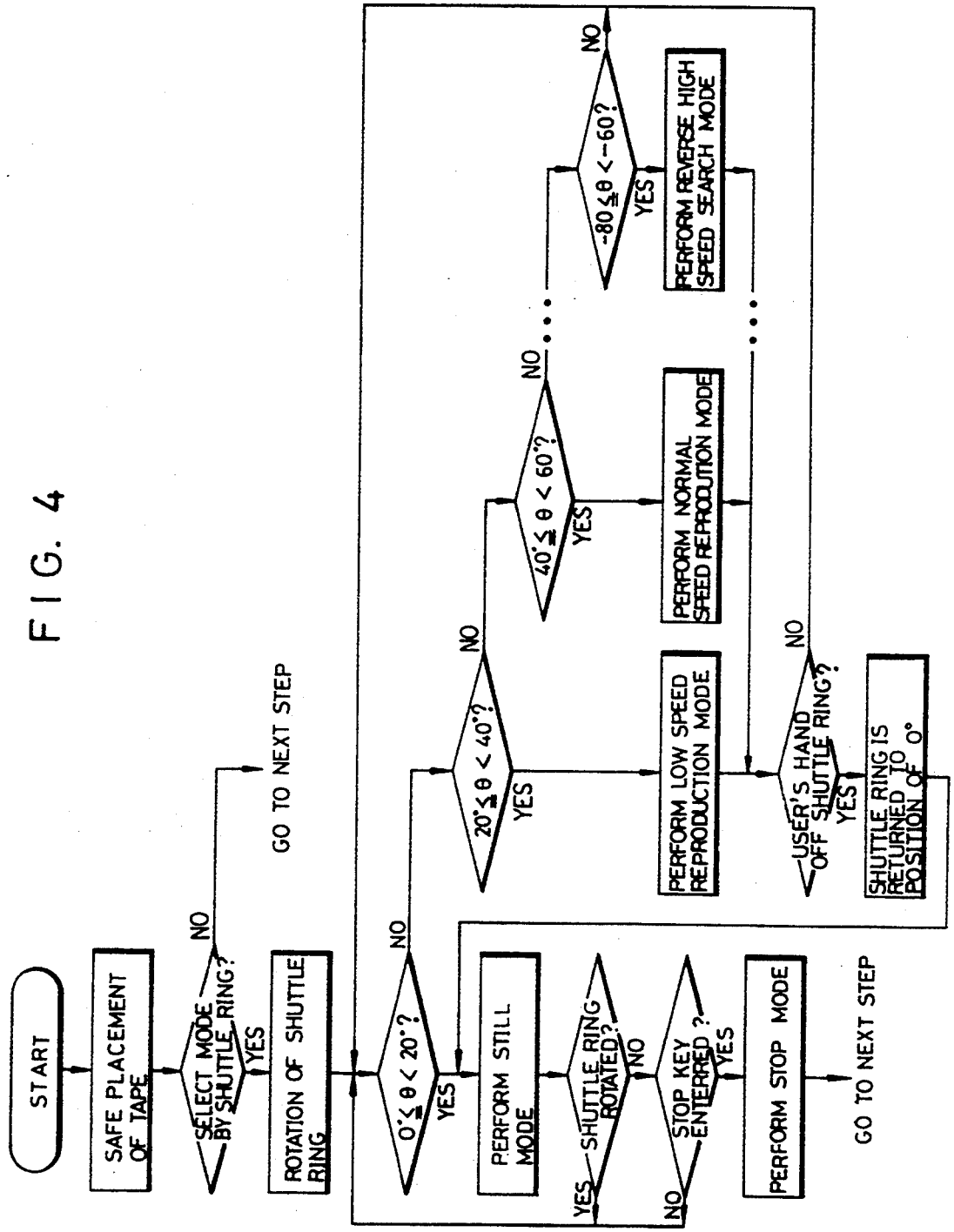
FIG. 4 is an algorithm diagram explaining the operational control method according to the apparatus of FIG. 1.
Figure 5:
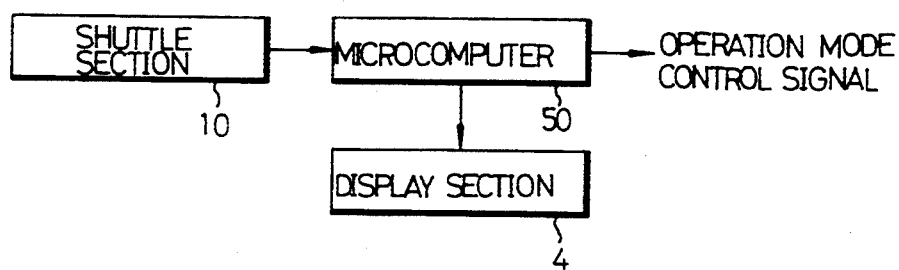
FIG. 5 is a block diagram of the operational control apparatus according to the present invention.

Referring to FIG. 5, the operational control apparatus for a VCR according to the present invention comprises a shuttle section 10 having a shuttle ring and generating a digital signal corresponding to an operational mode in accordance with the rotational angle of the shuttle ring, microcomputer 50 for detecting a rotational angle of the shuttle ring by the digital signal provided from shuttle section 10 and providing an operational mode control signal corresponding to the detected rotational angle, and a display section 4 connected to microcomputer 50, for displaying the current selected operational mode.

FIG. 7A shows patterned contacts on a substrate of the shuttle ring according to the present invention, and FIG. 7B shows the signal state for each mode according to the patterned contacts in FIG. 7A.

As shown in FIGS. 7A and 7B, in order to select all operational modes of a VCR, the rotational angle $\theta$ of the shuttle ring is subdivided in detail, for example, a space of 10° particularly, for each reproduction-related mode, so that the number of mode selection signals is increased. If necessary, the number of terminals can be increased so that the number of mode selection signals is further increased.

All operational modes A to N in FIG. 7B are determined so as to correspond to all operational modes of a VCR including reproduction-related modes, tuning mode, and OSD (On-Screen Display) mode.

When the rotational angle of the shuttle ring is between 0° and 10° in FIG. 7A, shuttle section 10 provides a signal of "0000" as shown in FIG. 7B since none of terminals 1 to 4 is connected to the B+ supply voltage. Accordingly, microcomputer 50 performs H(still) mode.

And, if the rotational angle of the shuttle ring is between −50° and −40°, terminals 1,2 and 4 are connected to the B+ supply voltage, so that shuttle section 10 provides a signal of "1101", causing microcomputer 50 to perform C mode.

Display section 4 is connected to microcomputer 50 and visually displays the current selected mode.

Figure 6:
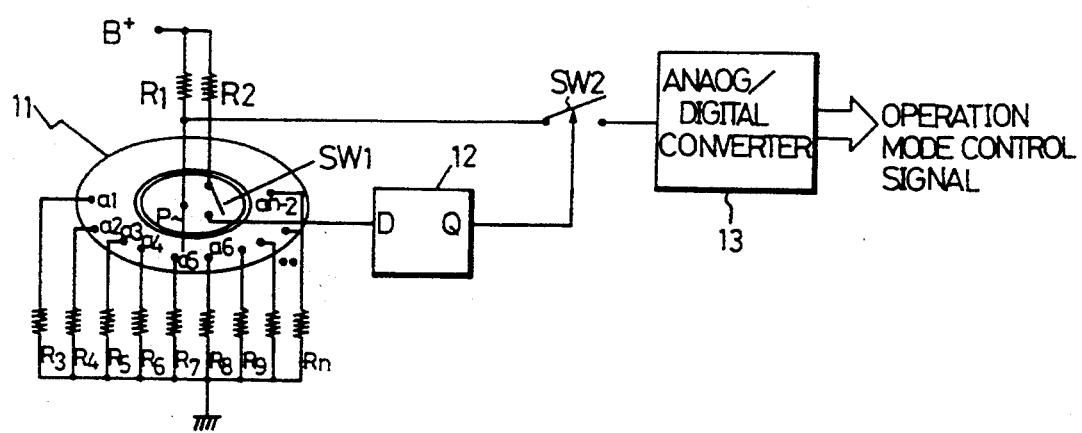
FIG. 6 is a circuit diagram of another embodiment of the shuttle section in FIG. 5.

FIG. 6 shows another embodiment of the shuttle section according to the present invention. The shuttle section comprises shuttle ring 11 which includes switch SW1 being turned on/off as a user presses shuttle ring 11, a movable contact P and fixed contacts a1 to an selectively connected to each other in accordance with the rotational angle of shuttle ring 11, and resistors R1, R3 to Rn selectively connected to each of the contacts for dividing the B+ supply voltage, a flip-flop 12 being toggled in accordance with the "on/off" state of switch SW1, a switch SW2 controlled to switch an output voltage of shuttle ring 11 according to the output signal of flip-flop 12, and an analog/digital (A/D) converter 13 for converting the output voltage of shuttle ring 11 having passed through switch SW2 into a digital signal and providing the converted digital signal to microcomputer 50.

In this embodiment, as a user presses shuttle ring 11 when the B+ supply voltage is applied, switch SW1 is turned on/off and thus the B+ supply voltage is applied to flip-flop 12 through resistor R2 and switch SW1. Accordingly, the output of flip-flop becomes "high", causing switch SW2 to be turned on.

In this state, if a user rotates shuttle ring 11, movable contact P is selectively connected to fixed contacts a1 to an and thus shuttle ring 11 provides a voltage signal divided by resistor R1 and a resistor selected among resistors R3 to Rn. The output voltage signal is supplied to A/D converter 13 through switch SW2 and is converted into a digital signal to enter microcomputer 50.

Microcomputer 50 determines the rotational angle $\theta$ of shuttle ring 11 in accordance with the output signal of A/D converter 13 and provides an operational mode control signal corresponding to the determined rotational angle $\theta$ to perform the operational mode.

Referring to FIG. 8, movable contact P is selectively connected to fixed contacts a1 to an as shuttle ring 11 is rotated, and the corresponding voltage is provided from shuttle ring 11. The provided voltage is then converted into a digital signal by A/D converter 13.

Microcomputer 50 determines the rotational angle $\theta$ of shuttle ring 11 by the digital signal and performs the corresponding mode. The mode performed by microcomputer 50 may be reverse high speed search, reverse search, reverse normal speed reproduction, reverse low speed reproduction, still, low speed reproduction, normal speed reproduction, search, high speed search, tuning, and OSD modes.

At this time, if a user presses shuttle ring 11 again so that switch SW1 is turned on/off, flip-flop 12 is toggled to output a "low" level signal to cause switch SW2 to be turned off and thus A/D converter 13 provides no signal. Microcomputer 50 determines the above state to be a stop mode and performs the stop mode.

Figure 9:
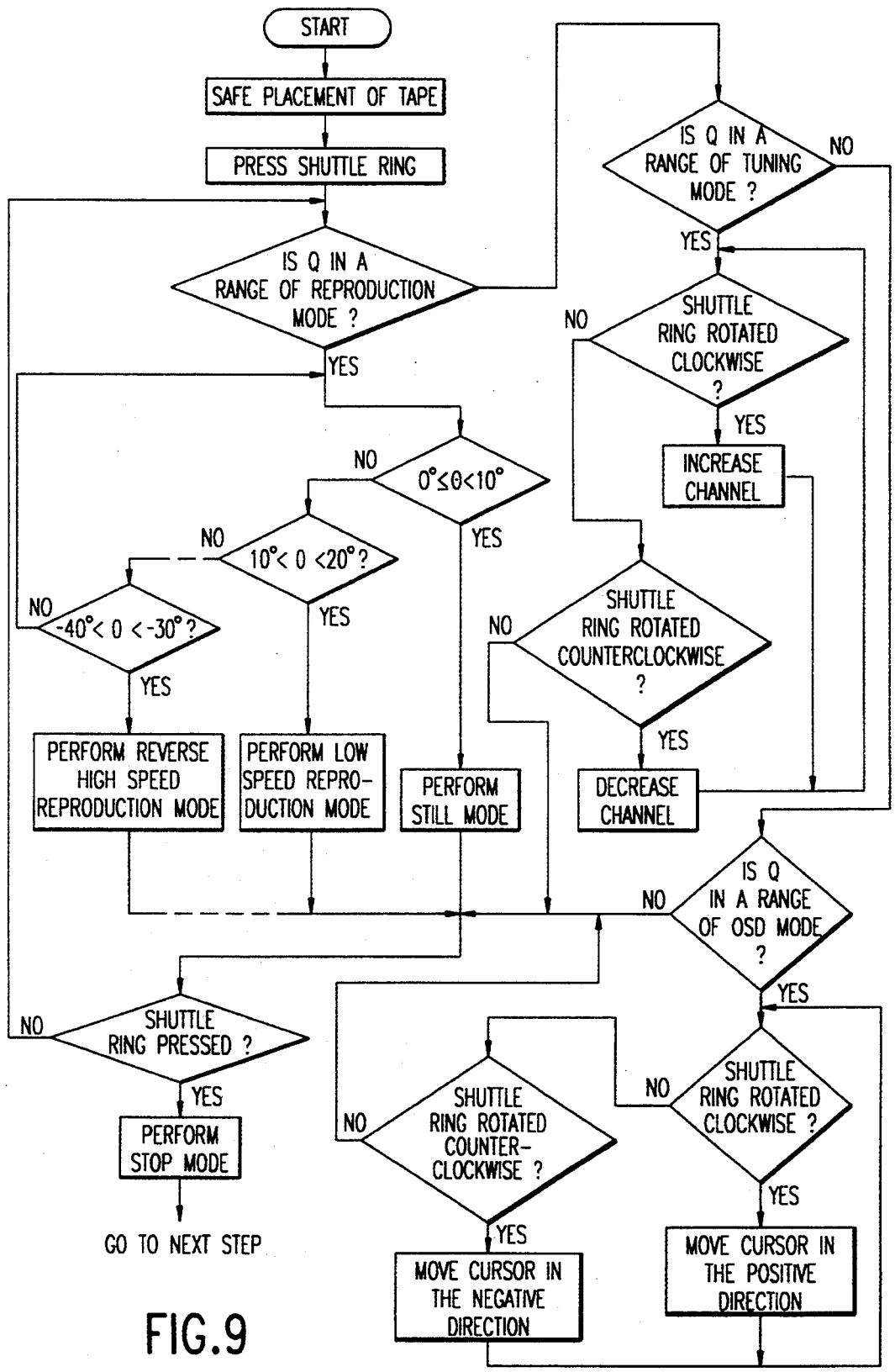
FIG. 9 is an algorithm diagram embodying the operational control method according to the present invention.

FIG. 9 shows an algorithm to which the operational control method for a VCR utilizing a shuttle ring according to the present invention is applied. If a user presses shuttle ring 11 when a cassette tape is safely placed, microcomputer 50 determines the rotational angle $\theta$ of shuttle ring 11 by the digital signal provided from shuttle section 10 and provides a mode control signal for performing an operational mode corresponding to the determined rotational angle.

That is, if the current rotational angle $\theta$ is within a region of the reproduction-related modes, microcomputer 50 determines a subdivided region in which the current angle $\theta$ is positioned and performs one mode among the reproduction-related modes corresponding to the determined subdivided region as shown in FIG. 8.

Moreover, if the current rotational angle $\theta$ is within the region of tuning mode or OSD mode, microcomputer 50 performs tuning mode or OSD mode during which the channel frequency is increased or decreased, or a cursor on a display screen (not illustrated) is moved in the positive or negative direction in accordance with the rotational direction of shuttle ring 11.

When performing the selected mode, if a user presses shuttle ring 11 again, the output of flip-flop 12 becomes "low" so that switch SW2 is turned off. Accordingly, A/D converter 13 provides no signal and thus microcomputer 50 performs stop mode.

From the foregoing, it will be apparent that the present invention can control all operational modes of a VCR by utilizing only a shuttle ring, requiring no key matrix for mode selection and thus the manufacturing cost can be reduced as well as increasing convenience in use. Moreover, the structure of the shuttle ring becomes compact so that reliability and endurance of the apparatus can be improved.

While the present invention has been described and illustrated herein with reference to the preferred embodiments thereof, it will be understood by those skilled in the art that various changes in form and details may be made therein without departing from the spirit and scope of the invention.

What is claimed is:

1. An operational mode control apparatus for a video cassette recorder utilizing a shuttle ring, comprising:
    a shuttle section having said shuttle ring and providing a digital signal corresponding to a divided region of a rotational angle of said shuttle ring, wherein the shuttle section comprises:
        a movable contact and a plurality of fixed contacts which are patterned on said shuttle ring and selectively connected to each other in accordance with the rotational angle of said shuttle ring, a plurality of resistors connected to said fixed contacts, respectively, for dividing supply voltages being applied to said fixed contacts, respectively, and an analog/digital converter for converting the voltages divided by said resistors into digital signals, respectively, for providing converted output signals; and
    a microcomputer for determining the region of the rotational angle of said shuttle ring according to the output signals provided by the shuttle section and providing an operational mode control signal corresponding to the determined region of the rotational angle of said shuttle ring;
    wherein the number of the divided regions of the rotational angle of said shuttle ring is determined corresponding to the number of all operational modes, including reproduction-related modes, a tuning mode, and an on-screen display mode of said video cassette recorder.

2. An operational mode control method for a video cassette recorder utilizing a shuttle ring, comprising the steps of:
    determining in which region the present rotational angle of the shuttle ring is among from predetermined regions of reproduction-related modes, a tuning mode, and an on-screen display mode by determining a mode according to the determined rotational angle and determining a function corresponding to the determined mode;
    performing one of the reproduction-related modes corresponding to a subdivided region in the region of the reproduction-related modes if it is determined that the present rotational angle is in the region of the reproduction-related modes;
    tuning a channel by increasing or decreasing a channel tuning frequency in accordance with the rotational direction of the shuttle ring within the region of the tuning mode if it is determined that the present rotational angle is in the region of the tuning mode; and
    making a cursor on a display screen move in the positive or negative direction in accordance with the rotational direction of the shuttle ring within the region of the on-screen display mode if it is determined that the present rotational angle is in the region of the on-screen display mode.

3. An operational mode control apparatus as claimed in claim 1, further comprising:
    a first switch being turned on/off when said shuttle ring is pressed by a user;
    a flip-flop being toggled according to the on/off state of said first switch; and
    a second switch being turned on/off in accordance with the output of said flip-flop, for switching said divided voltages to be supplied to said analog/digital converter;
    wherein said microcomputer provides a stop mode control signal when said second switch is turned off.

4. An operational mode control method as claimed in claim 2, wherein the step of performing one of the reproduction-related modes includes selecting space of 10° as the subdivided region of the rotational angle.

5. An operational mode control method as claimed in claim 2, further comprising the steps of:
    determining if the shuttle ring is pressed; and
    selectively performing a stop mode when it is determined that the shuttle ring is pressed evenly.

* * * * *